E. S. MORRIS.
SPRING TIRE.
APPLICATION FILED NOV. 25, 1918.
1,322,258.
Patented Nov. 18, 1919.
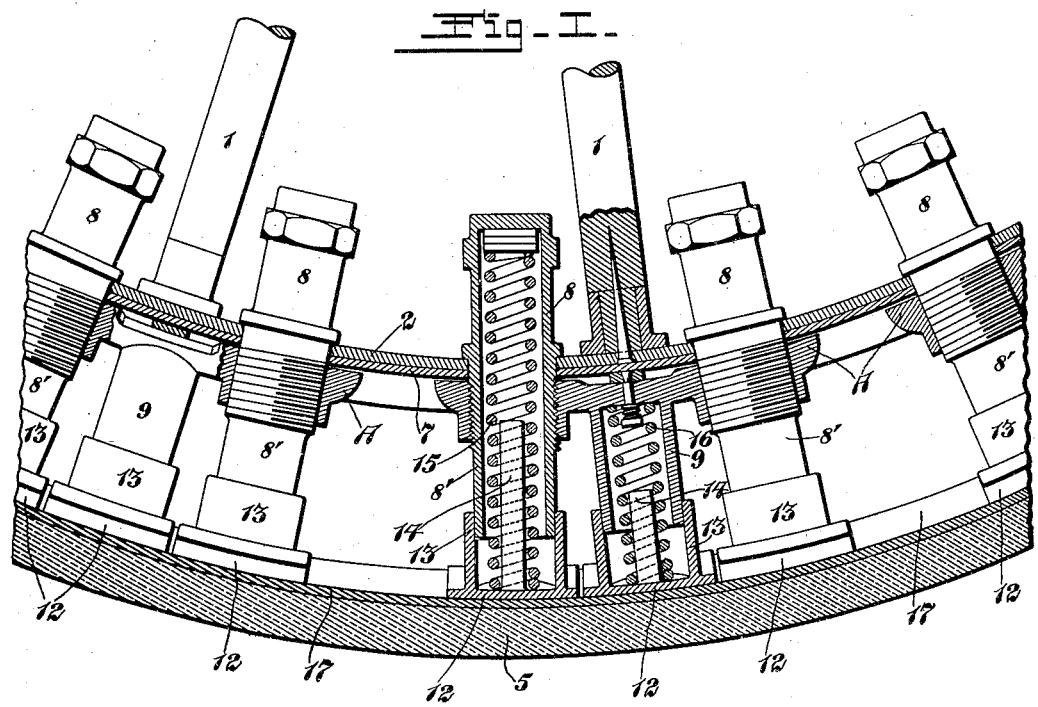
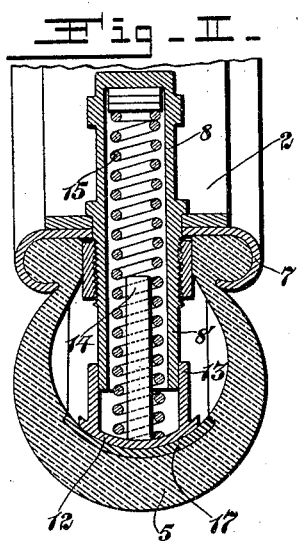
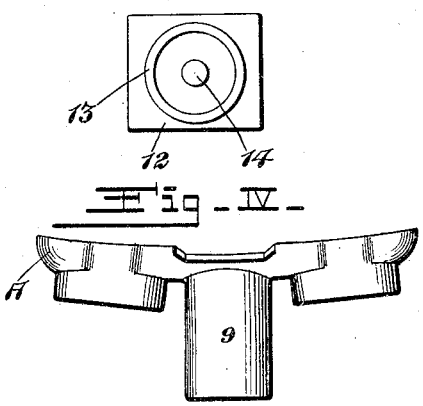
WITNESS.
Charles A. Becker
INVENTOR.
E. S. Morris,
BY
Knight & Cook
HIS ATTORNEYS.

UNITED STATES PATENT OFFICE.

EMANUEL S. MORRIS, OF ST. LOUIS, MISSOURI.

SPRING-TIRE.

1,322,258.   Specification of Letters Patent.   Patented Nov. 18, 1919.

Application filed November 25, 1918. Serial No. 264,104.

*To all whom it may concern:*

Be it known that I, EMANUEL S. MORRIS, a citizen of the United States of America, a resident of the city of St. Louis, in the State of Missouri, have invented certain new and useful Improvements in Spring-Tires, of which the following is a full, clear, and exact description, reference being had to the accompanying drawings, forming a part of this specification.

My present invention is a spring tire and is in the nature of an improvement upon the spring tire shown and described in U. S. Letters Patent No. 1,152,037, issued to me August 31, 1915. The spring tire described in said patent comprises a series of spring pockets arranged in a tire rim and having open ends presented to the interior of a tire casing held on the tire rim by spreaders, or binding members, to which the spring pockets are connected. Coil springs disposed in said pockets extend outwardly therefrom toward the periphery of the tire casing and have fitted to their outer ends spring seat members which rest against the peripheral portion of the tire casing, the springs being unsupported against lateral movement between the pockets and the outer spring seat members.

Practical experience has shown that a spring tire so constructed is quite meritorious, but has demonstrated need for lateral support of the springs between the spring pockets and the outer spring seat members to prevent lateral movement of the springs, and the present invention has for its object to furnish such support.

Figure I is a longitudinal section through a tire constructed in accordance with my present improvement, with a portion of the spring-holding elements and spring seat elements shown in elevation and the remainder in section.

Fig. II is a cross section taken through the tire at the location of one of the springs and the parts within which it is confined.

Fig. III is a plan view of one of the outer spring seat members looking toward its inner end.

Fig. IV is a side elevation of one of the supports or binding members to which the spring seat pockets are secured.

In the drawings, 2 designates a felly ring secured to the spokes 1 of a wheel and surrounded by a casing-receiving rim 7 to which a tire casing 5, having separable edges, may be applied. The casing is held to said rim by spreaders or binding members A, having screw threaded apertures therein into which spring pockets 8 are inserted as in my former patent, thereby providing for the spring pockets, which extend through the felly ring 2 and the tire-receiving rim 7, serving to hold the members A tightly pressed against the separable edges of the tire casing 5 for the purpose of retaining said casing in place on said rim.

In the present construction the spring pockets 8 include hollow stems 8', which project considerably beyond the outer faces of the members A, to act as extended housings for the coil springs 15 in the pockets 8.

Each casing-retaining member A has secured thereto, intermediately of the spring pockets 8, an auxiliary spring pocket 9, which extends outwardly and into the casing 5 to substantially the same degree as the stems 8' of the spring pockets 8, and which partially inclose auxiliary coil springs 16, the pockets 9 being in reality hollow stems similar to the extensions of the spring pockets 8.

12 designates outer spring seat members resting against the inner face of the peripheral portion of the tire casing 5 and provided with sleeves 13 telescopically fitted to the outer faces of the spring pockets 8 and 9, so that said spring pockets and said outer spring seat members 12 completely house the springs 15 and 16 located in the pockets. Each of the outer spring seat members 12 is provided interiorly of its sleeve 13 with a stem 14, which is carried by the head of the member and is centrally located within the sleeve of said member. These stems extend through the coil springs 15 and 16 from their outer ends to points considerably beyond the outer ends of the spring pockets 8 and 9.

By the construction herein described, I so house and support the springs of my tire as to substantially eliminate any lateral movement of these springs. During the compression and expansion of the springs in the use of the tire, the sleeves of the outer spring seat members slide telescopically against the outer faces of the spring pockets 8 and 9, thereby preventing lateral movement of the spring seat members. The stems 14 situated within the coil springs serve to centralize the springs and prevent kinking and bowing thereof, which would detract from their efficiency.

A flexible band 17 is placed within the casing 5 of my tire at its tread, this band being preferably of steel. The band is of such nature that the outer spring seat members 12 will slip readily thereon circumferentially of the tire. When a tire is in service the outer spring seat members are subjected to strain in a direction circumferentially of the tire, which tends to move them and the springs resting against them in a direction away from the line of force, but by providing the flexible band 17 the outer spring seat members readily adjust themselves toward the line of force, with the result of preventing buckling of the springs and wearing or breaking strain upon the members incasing the springs.

I claim:

1. The combination with a tire rim, of a spring tire comprising a casing secured to said rim, spring pockets extending through said rim and into said casing, springs in said pockets, and outer spring seat members having sleeves fitting over said spring seat pockets and telescoping thereon.

2. The combination with a tire rim, of a spring tire comprising a casing fitted to said rim, casing-holding members resting against said casing to hold it in engagement with said rim, spring pockets extending outwardly from said casing-holding members, an auxiliary spring pocket carried by each casing-holding member between said spring pockets, and outer spring seat members opposed to the peripheral portion of said casing and having sleeves fitted over and telescoping on said spring pockets.

3. The combination with a tire rim, of a spring tire comprising a casing secured to said rim, spring pockets extending outwardly in said casing relative to said rim, springs in said pockets, and outer spring seat members resting against the peripheral portion of said casing, said outer spring seat members having sleeves telescopically fitted to the outer faces of said spring pockets, and also having stems extending inwardly within said springs and into said spring pockets.

In testimony that I claim the foregoing I hereunto affix my signature.

E. S. MORRIS.